United States Patent [19]

Traster

[11] 4,290,064

[45] Sep. 15, 1981

[54] VIDEO DISPLAY OF IMAGES WITH IMPROVED VIDEO ENHANCEMENTS THERETO

[75] Inventor: Elden D. Traster, Garland, Tex.

[73] Assignee: Harris Data Communications, Inc., Dallas, Tex.

[21] Appl. No.: 63,529

[22] Filed: Aug. 3, 1979

[51] Int. Cl.$^3$ .............................................. G06F 3/153

[52] U.S. Cl. .................................... 340/723; 340/750; 340/799

[58] Field of Search ............... 340/723, 724, 731, 799, 340/703

[56] References Cited

U.S. PATENT DOCUMENTS

| | | | |
|---|---|---|---|
| 3,896,428 | 7/1975 | Williams | 340/731 |
| 3,911,418 | 10/1975 | Takeda | 340/703 |
| 4,163,229 | 7/1979 | Bodin et al. | 340/745 |
| 4,204,207 | 5/1980 | Bakula et al. | 340/723 |

*Primary Examiner*—David L. Trafton

*Attorney, Agent, or Firm*—Yount & Tarolli

[57] ABSTRACT

A video display terminal is disclosed for displaying dot pattern images of data characters on a display screen with dot pattern modifications being made to the video characteristics thereof. Multibit coded data words are supplied by a data source, such as a memory, to a character generator circuit which controls the display of data characters on the face of a video display screen. These coded data words include at least character codes and video modifier codes. Dot pattern video signals are provided for forming the dot pattern image represented by a coded data character. These dot pattern video signals are modified in accordance with a video dot pattern modifier so that the video image is formed with the modification made thereto. The video modifiers are selectable so that one or more of a plurality of video modifiers may be in effect for a given data character. Additionally, each of these pluralities of modifiers may be programmably chosen from one of a second plurality of available video modifiers.

5 Claims, 5 Drawing Figures

VIDEO DISPLAY OF IMAGES WITH IMPROVED VIDEO ENHANCEMENTS THERETO

BACKGROUND AND FIELD OF THE INVENTION

This invention relates to the video display of images and, more particularly, to improvements in modifying the video presentation of images representing data characters and the like.

Whereas the invention is described herein in conjunction with video display systems which may incorporate a host computer and individual terminals, it is to be appreciated that the invention is not limited thereto but may also be employed in a stand alone video display terminal or other apparatus for displaying graphical images wherein it is desirable to provide video modifications thereto.

Video display systems which employ terminals having means for displaying data characters as well as for modifying the video characteristics of the displayed characters are known in the art. Typically such systems have a fixed number of video modifications or "enhancements" that can be made and that such modifications deal with non-dot pattern modifications, such as dot position or dot intensity.

Improvements to such systems are represented by the co-pending United States patent application to R. E. Bakula et al., Ser. No. 829,043, filed on Aug. 30, 1977 now U.S. Pat. No. 4,204,207, and assigned to the same assignee as the present invention. That system discloses a pair of read only memories (ROM), one being used to store dot patterns to form characters, and the other being used to store dot patterns to provide video modifications to the characters to be displayed. Coded data words are supplied for addressing these two memories so that for a particular character certain associated video modifications may be made. The dot pattern video signals obtained from the character memory are modified by dot pattern video signals outputted from the enhancement or modification memory by ORing the two outputs together. This, then, provides a modified dot pattern which is used to form the video image representative of the character to be displayed together with one or more modifications to the dot pattern characteristics of the character. However, the number of video modifications that can be had is limited to the fixed number of dot pattern modifications stored in the enhancement memory, each of which is individually addressable.

SUMMARY OF THE INVENTION

It is an object of the present invention to provide an improved video display system having greater flexibility in providing video modifications than that represented by the system described immediately above.

It is a still further object of the present invention to provide a video display system employing video modifications of graphical images wherein the modification may be programmably varied.

It is a still further object of the present invention to provide video modifications wherein each character to be displayed may be provided with one or more of a first plurality of video modifications and wherein each of the first plurality of modifications may in turn be one of a second plurality of video modifications and that the choice within the first and second pluralities be under program control.

In accordance with the present invention, a video display terminal is disclosed for displaying dot pattern images of data characters on a display screen with dot pattern modifications being made to the video characteristics thereof. Multibit coded data words are supplied by a data source, such as a memory, to a character generator circuit which controls the display of data characters on the face of a video display screen. These coded data words include at least character codes and video modifier codes. Dot pattern video signals are provided for forming the dot pattern image represented by a coded data character. These dot pattern video signals are modified in accordance with a video dot pattern modifier so that the video image is formed with a video modification made thereto. The video modifiers are programmably selectable so that one or more of a plurality of video modifiers may be in effect for a given data character. Additionally, each of these pluralities of modifiers may programmably be selected from one of a second plurality of available video modifiers.

BRIEF DESCRIPTION OF THE DRAWINGS

The foregoing and other objects and advantages of the invention will become more readily apparent from the following description of the preferred embodiment of the invention as taken in conjunction with the appended drawings wherein.

DETAILED DESCRIPTION

General Description

Reference is now made to the drawings wherein the showings are for purposes of illustrating a preferred embodiment of the invention only and not for purposes of limiting the same.

Figure 1:
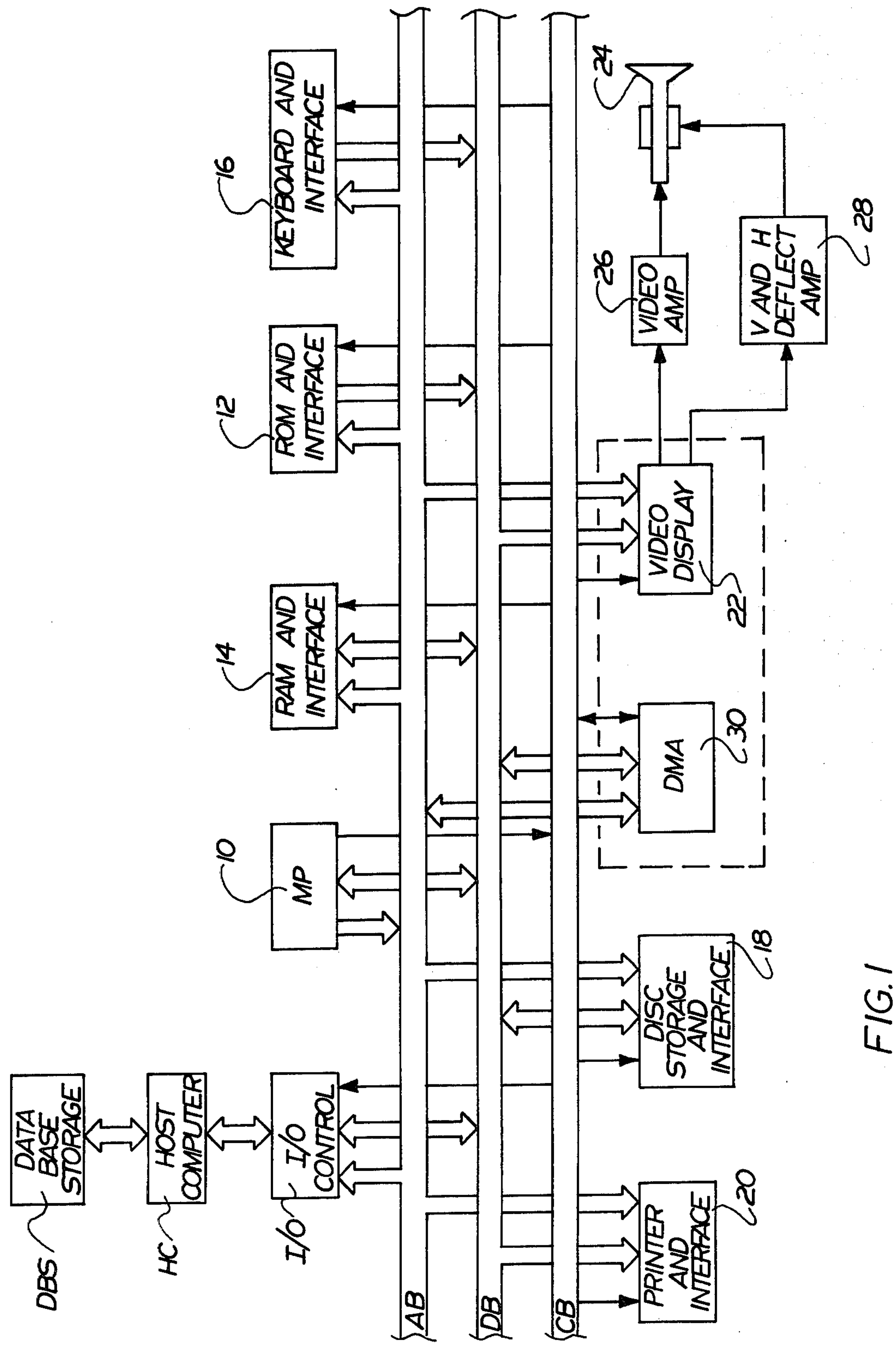
FIG. 1 is a schematic-block diagram illustration of one application of the present invention.

FIG. 1 is a schematic-block diagram illustration of a video display terminal which may interact with a host computer. The terminal is a processor driven terminal employing a common bus structure including an address bus AB, a data bus DB, and a control bus CB. The address bus AB may, for example, be a sixteen bit bus, whereas the data bus may be an eight bit bus. An interface to the host computer HC may be had by way of a suitable input/output control IO. This conventionally includes a universal synchronous, asynchronous receiver transimitter (USART). The input/output control IO communicates in a conventional manner with the address bus, the data bus and the control bus. Also connected to the common bus is a microprocessor 10 and external memories 12 and 14. Memory 12 may store the instruction sets for the processor and may take the form of a read only memory (ROM). Instruction sets are obtained from memory 12 in response to a program counter in the processor placing an address on the address bus AB. Memory 12 then responds by outputting data in the form of an instruction set to the data bus DB in a conventional fashion.

Data to be displayed or otherwise manipulated by the processor is stored in memory 14 and takes the form of a read/write random access memory (RAM). The data stored in memory 14 may be obtained from an input peripheral such as a keyboard 16, the host computer HC, a tape reader or the like, or perhaps a local disc storage such as storage 18. Under program control, data may be outputted to such output peripherals as a conventional printer 20 or by way of the input/output control IO to the host computer HC for storage at the data base storage DBS. Additionally, data to be displayed may be outputted to a video display circuit 22 for subsequent display on the face of a cathode ray tube 24. Suitable amplifying circuits including a video amplifier 26 and a vertical and horizontal deflection amplifier 28 are employed and used in a conventional manner. Data to be fetched from RAM 14 for subsequent display on the cathode ray tube may be accessed by means of a direct memory access circuit 30 of conventional design, such as that known as model AMD9517. Such a memory access circuit serves in response to control signals, as from a character generator within the video display 22, to fetch data from memory 14 by way of the data bus DB. This data is then supplied to the video display control circuit where it may be buffered to provide video patterns representative of the data characters for display on the cathode ray tube.

Figure 2:
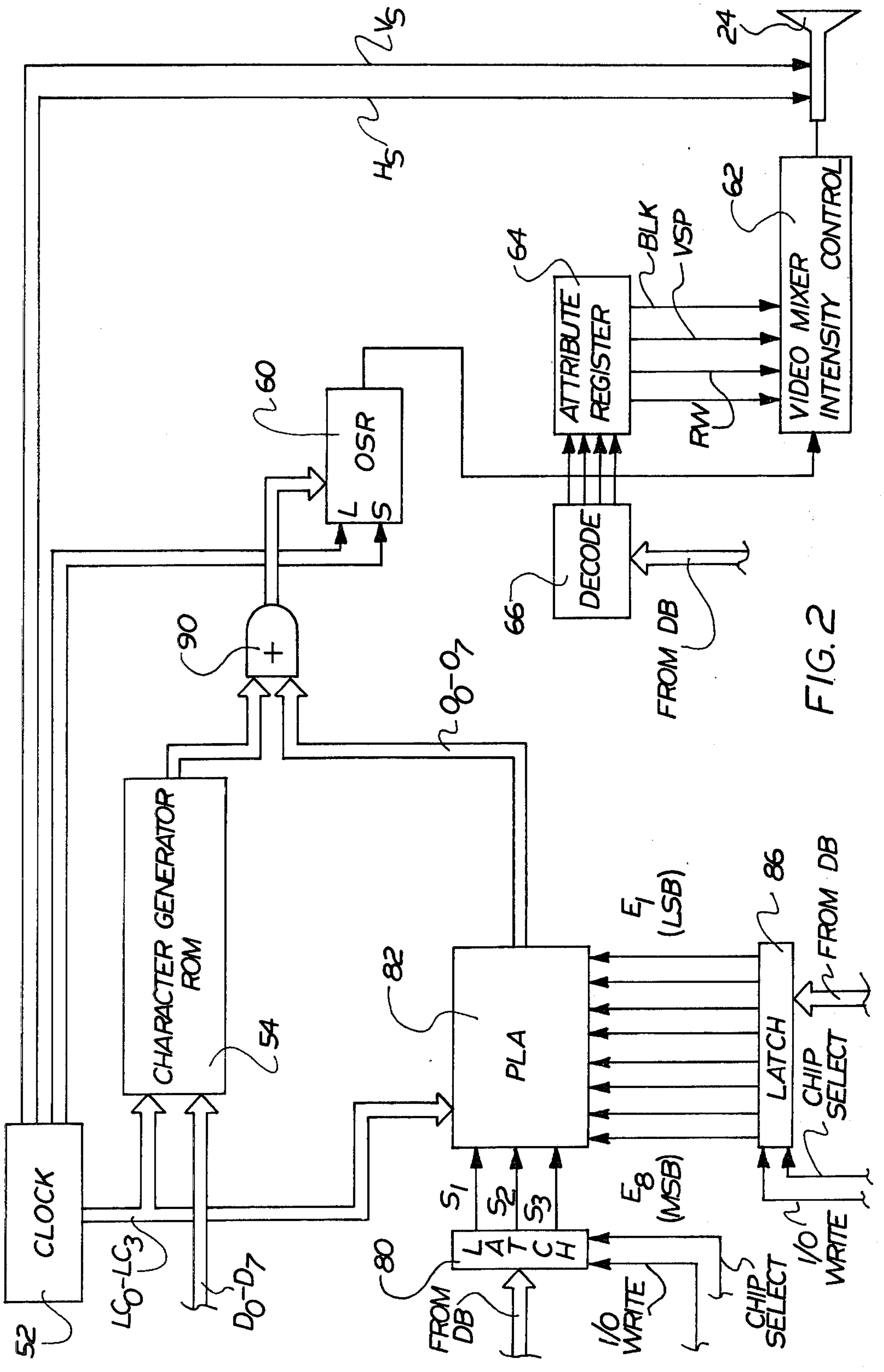
FIG. 2 is a schematic-block diagram illustration showing in greater detail the video display circuitry employed in conjunction with the present invention.

Reference is now made to FIG. 2 which illustrates the video display circuit in greater detail. This circuit employs a character generator 50 which utilizes a TV type raster scan, the scanning of which is controlled by horizontal and vertical synchronizing signals $H_s$ and $V_s$ provided by a suitable timing and control circuit, sometimes referred to hereinafter as clock circuit 52. In this type of display, each horizontal scan line generates a linear segment or "stroke" of each of the characters being displayed at that vertical position on the screen. Character generator 50 serves to control the generation of alphanumeric characters for display on the face of the cathode ray tube 24. In a conventional fashion, a read only memory 54 stores a font of dot patterns for the various characters and symbols to be displayed by the cathode ray tube 24. Each character is displayable within a $9\times16$ dot matrix pattern. The address for addressing a dot pattern stored in memory 54 is obtained from the coded characters supplied to the data bus DB by memory 14. These coded characters may be first buffered, as with a line buffer, so that a line of coded characters corresponding with a line of characters to be displayed are stored. The coded data characters may also be supplied directly to the character generator ROM 54.

Memory 54 stores a font of dot patterns of the various characters and symbols to be displayed by the cathode ray tube 24. Each dot character or symbol is displayable within a character field, such as a $9\times16$ dot matrix. The dot character itself may take up only a $7\times9$ dot matrix pattern, however, the additional dots are required for intercharacter and interline spaces and descending characters. The address for addressing a dot pattern stored in memory 54 is the coded character ($D_0$–$D_7$) and a four line coded line count $LC_0$–$LC_3$ obtained from the video control and timing circuit 52. During the generation of a line of characters with a TV raster scan, each scan lays down one slice or dot pattern segment for each of the characters on a line. Succeeding scans provide the remaining slices or dot segments. Consequently, then, for a $9\times16$ dot character field, sixteen scan lines may be required. This means that for each character generated, the memory 54 must be addressed at least sixteen times for the potential sixteen dot segments and this line of data characters in the line buffer will be recirculated at least sixteen times and the count provided by the line count data will be incremented with each circulation. The address, then, for each dot pattern is a combination of the line count together with the character code.

Each time a line segment dot pattern is outputted from memory 54, it appears as a bit pattern which is loaded in parallel into an output shift register 60 when that register receives a load signal from clock 52. The dot pattern is shifted in bit serial fashion out of the output shift register in synchronism with shift or clock pulses supplied to the shift input of the register 60 from clock 52. As is conventional, the dot pattern segments control the blanking-unblanking operation of the cathode ray tube. As the beam is being scanned horizontally across the screen, a dot pattern is displayed with each line segment being in accordance with the associated bit pattern outputted from register 60. At the end of a scan line there will be an interval which may be considered as the horizontal blanking interval and it is during this interval that a horizontal synchronization signal $H_s$ is provided by the timing control circuit 52. This, in a conventional fashion, causes the beam to flyback or retrace to its original location where the beam is automatically incremented downwardly by one scan line in a position to commence tracing of a second scan line across the face of the cathode ray tube. The scans will continue through a character line, which, in the embodiment being described, will require sixteen scan lines. The number of visible character lines in a vertical direction will be determined in large measure by the size of the cathode ray tube. In the example being given, that may be on the order of sixteen character lines, each requiring sixteen scan lines. A vertical blanking interval will occur at the bottom of the screen for approximately 30 scan lines and it is during this interval that a vertical synchronization signal $V_s$ is generated by the control and timing circuit 52. This causes the beam to flyback to its home position, normally located in the upper left-hand corner of the cathode ray tube.

The dot patterns outputted from the output shift register 60 are supplied to the intensity control of the cathode ray tube 24 to control the blank-unblank operations of the beam to be traced across the face of the tube. Conventionally, the bit stream outputted from register 60 may first be mixed with certain attributes supplied to a video mixer and intensity control circuit 62. This control circuit modifies the output bit stream with such attributes as reverse video (RVV), character blank (BLK) or video suppress (VSP). One or more of these attributes may be invoked by one or more of the attribute outputs being raised by an attribute register 64. Which of these attributes may be in effect is dependent upon decoding of an attribute code in the data bit stream by way of a suitable decoder 66. This decoder will decode an attribute code from the data stream and supply the correct logic command to the attribute register 64 so as to raise the proper attribute line to the video mixer and intensity control circuit 62. For example, when the attribute line RVV is raised, this is indicative that no video is allowed. If the video suppress attribute (VSP) is raised, this is indicative that no characters are allowed. If the reverse video modifier is also raised, the video signals will assume a reverse video level. If the reverse video (RVV) attribute line is raised, this is indicative that the video should be inverted.

The description given thus far has been with respect to a relatively conventional processor driven terminal, sometimes known as an intelligent terminal. Such a terminal may be employed to access data stored at a host computer for display, as on a cathode ray tube. The manipulation of data within the terminal is under process control pursuant to instruction sets stored within the processor as well as those stored in the read only memory 12. Additional instruction sets may be downloaded, as desired, from the host computer HC and stored in the random access memory 14. Such terminals are used in various applications requiring data processing and such applications may include editing of text and the like. Video display terminals having structures other than that as described thus far may also be employed in practicing the present invention.

In the system described in the Bakula et al. patent discussed hereinbefore, the dot patterns outputted from a character generator read only memory were ORed with dot pattern modifications outputted from a second read only memory. This caused the dot pattern video signals outputted from the output shift register to be modified in accordance with the dot pattern enhancement obtained from the second memory. The dot pattern enhancement is comprised of one or more of a fixed plurality of enhancements. However, no provisions were made to vary by program control any one of the plurality of enhancements. This is achieved in accordance with the present invention with circuitry as illustrated in FIG. 2 to which reference is now made.

Figure 3:
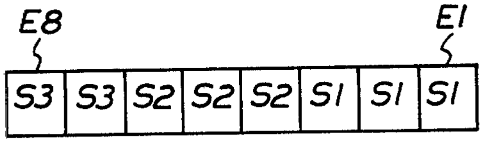
FIG. 3 is a schematic illustration of a multibit data word.

It is contemplated that each character to be displayed may have its video dot pattern characteristics modified by one or more of three different video overlays $S_1$, $S_2$ and $S_3$. The coded data word obtained from the data bus is supplied to a latch register 80 and the coded pattern will determine whether video overlay $S_1$, $S_2$ or $S_3$ or any combination thereof is to be in effect. These outputs are supplied to a program logic array (PLA) 82 together with the four bit line count $LC_0$ to $LC_3$ obtained from clock 52. If one or more of the video overlay outputs $S_1$, $S_2$ and $S_3$ is raised, then that overlay or overlays will be in effect. The meaning of the overlay itself is dependent on a programming word in latch register 86. This word in an eight bit word and is obtained from the data bus once register 86 has been selected by a chip select signal and the IO write line has been raised. This coded word is represented in FIG. 3. The two most significant bit positions are used to designate different overlays for $S_3$ and the next three most significant bit positions are used to select different overlays for $S_2$ whereas the three least significant bit positions are used to select different overlays for $S_1$. Consequently, in such an eight bit system there are four choices for overlay $S_3$ and eight choices each for overlays $S_2$ and $S_1$. These overlays and the associated programming therefor is represented below in Table 1.

TABLE I

| Programming Select | S1 | S2 | S3 |
|---|---|---|---|
| 000 | Horizontal strike through | Black Characters | Highlight |
| 001 | Cross hatch | cross hatch | cross hatch |
| 010 | diagonal strike | diagonal strike | diagonal strike |

TABLE I-continued

| Programming Select | S1 | S2 | S3 |
|---|---|---|---|
| 011 | dashed underline | dashed underline | dashed underline |
| 100 | open box | open box | |
| 101 | underdot | underdot | |
| 111 | double underline | double underline | |

Referring now to Table I, it is seen in the first column that the programming select provides a column of bit patterns associated with either S1, S2 or S3. The last two bits of the first four program select words apply only to overlay S3. With these bit patterns used in the programming word illustrated in FIG. 3, it is seen that for overlay S1, eight different overlays may be programmed. Consequently, then, the S1 bit pattern in the programming word, as for example, a bit pattern of 010 and if the S1 overlay output is raised, then the S1 overlay video modification to a character will be a diagonal strike. This bit pattern will be outputted by the PLA 82 in synchronism with the line scan count $LC_0$–$LC_3$ along with that outputted from the memory 54 with the two being ORed with an OR gate 90 and supplied to the output shift register 60 in synchronism with a load command. These bit patterns or strokes will then be outputted in a bit series stream from the output shift register and mixed with the attributes obtained from register 64 at the video mixer and intensity control 62 to control the cathode ray tube 24. In the example being given, the dot pattern for the character addressed at memory 54 will have superimposed on it the video modification dot pattern outputted from the PLA 82. Additionally, overlay S2 may also be in effect, and for example, under program control the meaning of overlay S2 may take the form of an open box (see Table I). Consequently, the dot pattern of this would also be outputted along with the dot pattern for diagonal strike (S1). Additionally, overlay S3 may be programmed to indicate, for example, a dashed underline, and in this case an additional video modification may be had so that a dashed underline is provided under the character. If none of the video overlay outputs S1, S2 and S3 is raised, then no video overlay or modification data from the PLA 82 will be provided. In such case, only the character pattern outputted from memory 54 will be supplied to the output shift register to be mixed if desired with one or more attributes obtained from register 64.

Figure 4:
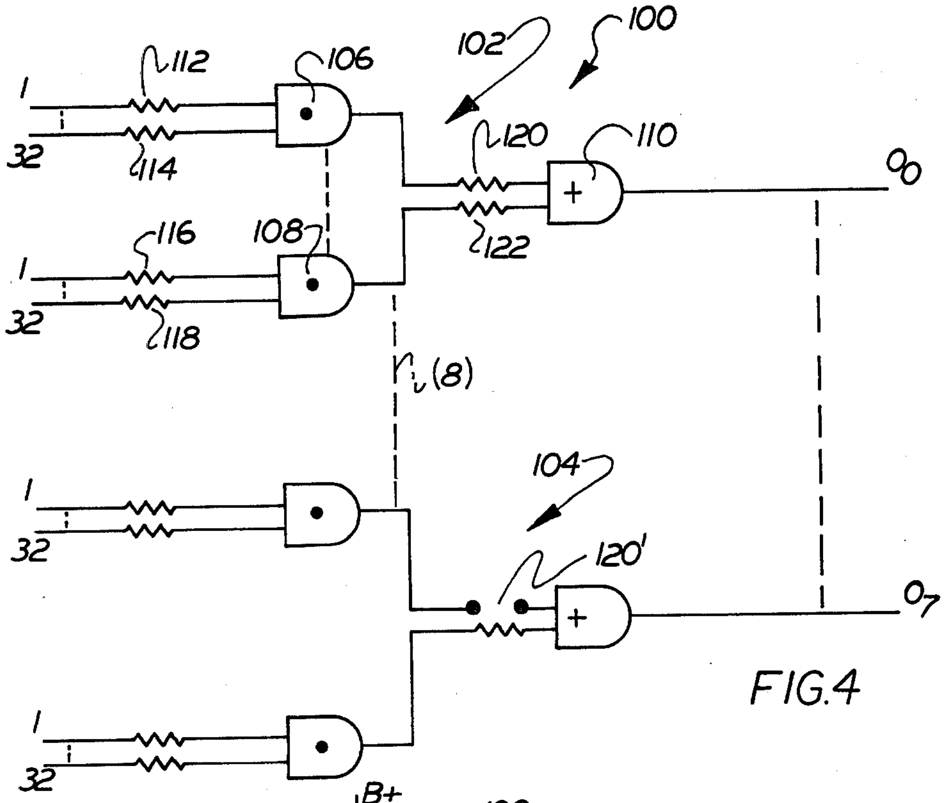
FIG. 4 is a schematic-block diagram illustration of circuitry employed in the present invention.
Figure 5:
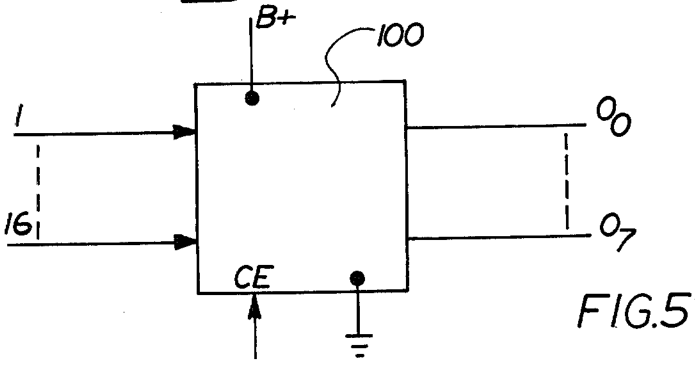
FIG. 5 is a block diagram illustration of the circuitry illustrated in FIG. 4.

The program logic array (PLA) 82 may take various forms, however, it preferably takes the form such as that provided by Signetics Corporation and known as their PLA model 82S100. The pin connections take the form as shown in FIG. 5, this being a sixteen bit input device and is activated upon receiving a chip enable signal and requires a DC power input on the order of +5 volts. The chip enable signal may be obtained as from the control bus CB on a signal outputted under program control by the processor 10. Basically, the circuitry takes the form similar to the simplified version thereof of FIG. 4. This includes a plurality of logic circuits of which two are illustrated as circuits 102 and 104. These are identical and each includes a plurality of logic gates such as AND gates 106 and 108 having their outputs supplied to an OR gate 110. Interposed between the inputs and the AND gates 106 and 108 there are provided a plurality of fuses such as fuses 112, 114, 116 and 118. Additionally, between the outputs of AND gates 106 and 108 and OR gate 110 there are provided fuses 120 and 122. The programmability is obtained by destroying one or more of these fuses in order to achieve a desired output bit pattern at outputs $O_0$–$O_7$. Each fuse preferably takes the form of a nichrome-titanium fuse. These are programmed by destroying selected fuses, preferably by supplying a high current level. As an example, fuse 120' in circuit 104 is illustrated as being blown so as to provide an open circuit. As shown in FIG. 5, the logic array is a sixteen bit input device. With reference to FIG. 2, then, it is seen that eight bits may be obtained from register 86 three bits may be obtained from the latch register and a four bits may be obtained from clock 52. Internally of the program logic array, each of the inputs is converted into either true and false versions so that for sixteen inputs and 32 signals are obtained. This pattern, then, of 32 input signals is supplied to each of the AND gates 106, 108, etc. and the bit pattern being outputted as an eight bit pattern $O_0$–$O_7$ will be determined by the nature of the binary levels of all of the input signals together with the manner in which logic array has been programmed (i.e., destroying one or more fuses).

Preferably, the PLA 82 is programmed to supply stroke patterns at its output $O_0$–$O_7$ in conjunction with the line scan count $LC_0$–$LC_3$ with the stroke pattern being determined by which one or more of the overlay outputs $S_1$, $S_2$ and $S_3$ is raised. The meaning of the selected one or more of the overlays $S_1$, $S_2$ and $S_3$ is determined by the program word $E_1$–$E_8$ obtained from the latch register 86. This program word (FIG. 3) has been described hereinbefore.

In summation, it is seen that under program control one or more of a first plurality of video overlays $S_1$, $S_2$ and $S_3$ may be in effect to modify the dot pattern outputted from the memory 54. The meaning of the overlay $S_1$, $S_2$ and $S_3$ is obtained from the programming word located in the latch register 86 and each of these video overlays may have one of second plurality of meanings (see Table I).

Although the invention has been described in conjunction with a preferred embodiment, it is to be appreciated that various modifications may be made within the spirit and scope of the invention as defined by the appended claims.

What is claimed is:

1. A video display system for displaying dot pattern images of data characters on a display screen with dot pattern modifications to the video characteristics thereof and comprising:

means for providing a data stream including a plurality of coded character words each representing a dot pattern image to be displayed and at least one coded modifier word each representing one or more of a plurality of N dot pattern modifiers;

means responsive to each said coded character word for providing dot pattern video signals for forming the dot pattern image represented thereby, means responsive to each said coded modifier word for providing dot pattern modifier video signals;

means for mixing said video signals to provide a combined dot pattern video signal;

means responsive to said combined video signals for forming a video image with said video dot pattern modifications made thereto; and said modifier word responsive means having N different selectable modes for providing one or more of N modifiers for modifying a said character with the dot pattern modification for each said modifier being determined by said coded modifier word.

2. A video display system as set forth in claim 1, wherein said modifier responsive means comprises an addressable bit pattern storage means for receiving N inputs, each representative of one of said N modifiers to be in effect and a said coded modifier word having S bits with N dedicated bit portions thereof each associated with one of said N modifiers and defining the meaning thereof.

3. A video display system as set forth in claim 2 including modifier select means for selectably supplying one or more of N modifier select signals and supplying same to said N inputs of said storage means to place one or more of said modifiers in effect.

4. A video system as set forth in claim 3 wherein said data stream includes a multibit coded modifier select word and said modifier select means includes means for receiving said modifier select word and in response thereto providing said one or more of said N modifier select signals.

5. A video display system as set forth in claim 4, wherein said modifier responsive means includes a programmed logic array programmed to supply said dot pattern modifier signals having bit patterns dependent upon which of said N inputs receives a said modifier select signal and the bit pattern provided by a said coded modifier word.

* * * * *